A. BERG.
ARTIFICIAL BAIT FOR TRAPS.
APPLICATION FILED AUG. 4, 1919.
1,319,832.
Patented Oct. 28, 1919.
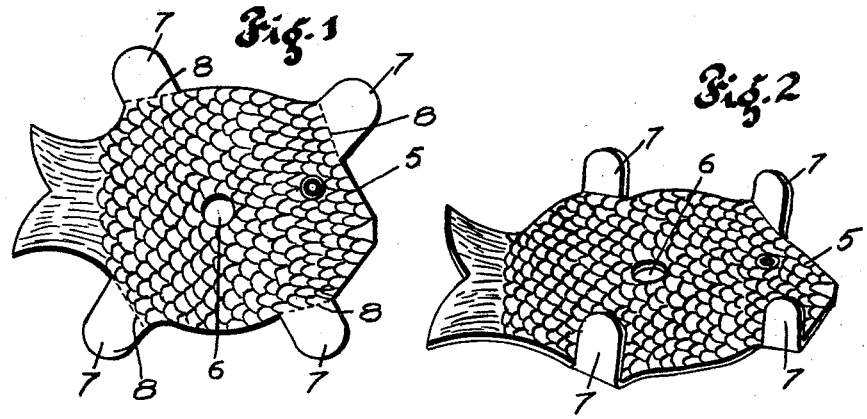
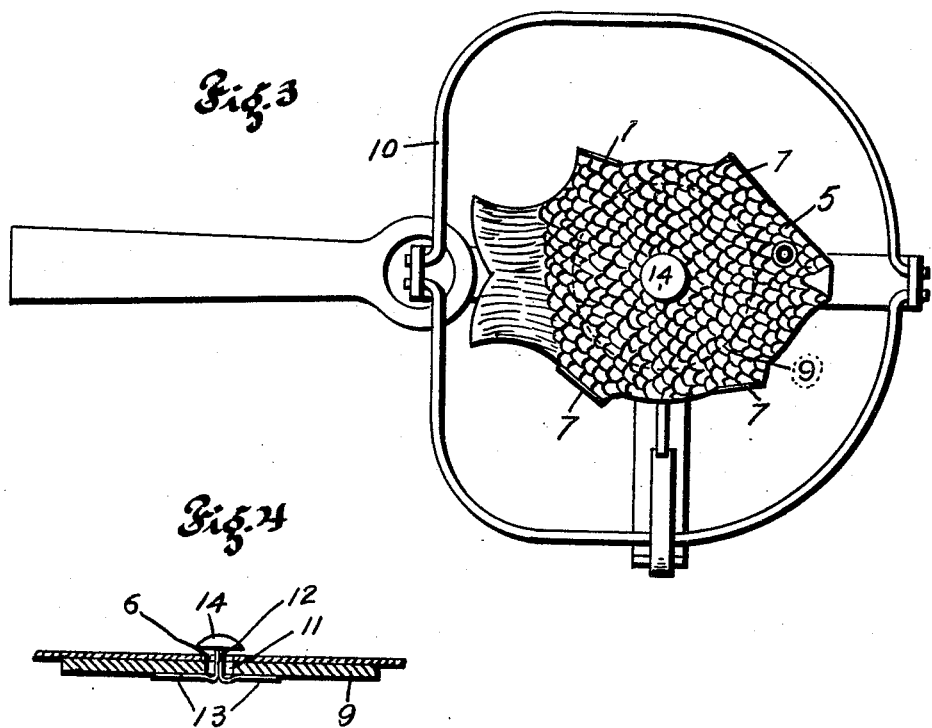
Inventor
Alexander Berg
by Edward E. Luegan
Atty.

UNITED STATES PATENT OFFICE.

ALEXANDER BERG, OF ST. LOUIS, MISSOURI.

ARTIFICIAL BAIT FOR TRAPS.

1,319,832.　　　　Specification of Letters Patent.　　Patented Oct. 28, 1919.

Application filed August 4, 1919. Serial No. 315,086.

*To all whom it may concern:*

Be it known that I, ALEXANDER BERG, a citizen of the United States, and resident of St. Louis and State of Missouri, have invented certain new and useful Improvements in Artificial Baits for Traps, of which the following is a specification containing full, clear, and exact description, reference being had to the accompanying drawings, forming a part thereof.

This invention relates to artificial baits for animal traps and has for its primary object a bait which is stamped of sheet metal and has flukes or up-turned portions, so that the same will vibrate or rotate when placed in running or agitated water.

A further object is to construct an artificial bait of sheet metal, coat the same with a luminous coating and attach the same loosely to the bait pan of a spring trap.

In the drawings,

Figure 1 is a plan view of my bait showing the same as it comes from the press.

Fig. 2 is a perspective view of the same with the flukes or projections bent in operative position.

Fig. 3 is a top plan view of a spring trap with my bait secured to the bait pan, and Fig. 4 is a cross sectional view of the bait, bait pan and the securing means.

In the construction of my device, I make use of a piece of sheet metal which is stamped into any desired shape, as indicated by the numeral 5, the form of this bait being that of any aquatic animal, such as a fish, frog or crawfish. This bait is provided with a circular central opening 6, and a plurality of projections 7. These projections are preferably four in number, although they may be increased or decreased according to the shape of the bait and the kind of water or stream in which they are to be used.

As shown in Fig. 1, the dotted lines 8 indicate the line on which these flukes are to be bent so that they will stand at an angle, as illustrated in Fig. 2, this being for the purpose of allowing either the waves or the force of the stream to act thereon.

The bait pan 9, which is attached to an ordinary spring trap 10 is provided with an opening or perforation 11, and through the opening 11 in the bait pan and an opening 6 in the bait, I insert a split rivet 12. This rivet may be either the ordinary split paper fastener, a cotter key or any other cheap device which can be manipulated by the fingers so as to loosely secure the bait to the bait pan.

The operation of my device is as follows: The bait is first stamped out and left entirely flat as indicated in Fig. 1. It is then coated with a luminous paint, which will glimmer through the water at night. The object of leaving the bait flat is for shipping purposes, so that the same will not occupy much room in the package.

When the trapper receives the bait and desires to secure it to the trap, he first bends up the flukes 7 into the position as shown in Fig. 2. The securing means or fastener 12 is then inserted through the openings 6 in the bait and 11 in the bait pan and the ends 13 bent over the bottom side of the pan 9. The head 14 of the securing means is, however, left a short distance above the bait so as to allow oscillation or rotation, depending entirely on the kind of water in which the trap is used. In other words waves will cause the bait to oscillate, while a flowing stream will have a tendency to cause the bait to rotate.

The luminous paint will show through the water and attract the attention of fur bearing animals, such as coons, mink or the like.

The trap is placed in the shallow portion of the water, and these animals being fishers will see the luminous bait and attempt to withdraw it from the water, thereby springing the trap and being caught.

Having fully described my invention, what I claim is:

1. An artificial bait for animal traps comprising a body portion, flukes formed integral with said body portion and adapted to be bent at substantially right angles thereto, a luminous coating applied to said bait, and means for loosely securing said bait to the bait pan of an animal trap.

2. An artificial bait for animal traps comprising a luminous stamped body portion provided with an opening and with integrally formed upturned flukes, said flukes adapted to cause vibration or rotation of the bait when placed in water.

3. An artificial bait for animal traps comprising a luminous stamped body portion provided with an opening and with integrally formed flukes, said flukes adapted to be bent upwardly and twisted at various angles to the periphery of the body portion for causing vibration or rotation of the bait when placed in water, and a fastener seated in said opening for securing the bait to a trap.

In testimony whereof I have signed my name to this specification, in the presence of two subscribing witnesses.

ALEXANDER BERG.

Witnesses:
JEAN GOLDBERG,
EDWARD E. LONGAN.

Copies of this patent may be obtained for five cents each, by addressing the "Commissioner of Patents, Washington, D. C."